US006530619B2

(12) United States Patent
Fukumoto et al.

(10) Patent No.: US 6,530,619 B2
(45) Date of Patent: Mar. 11, 2003

(54) OPENING AND CLOSING DEVICE FOR SLIDING VEHICLE DOOR

(75) Inventors: Ryoichi Fukumoto, Nagoya (JP); Masao Ohhashi, Kariya (JP); Shintaro Suzuki, Kasugai (JP); Seiichi Suzuki, Aichi-ken (JP); Tsuyoshi Terada, Nagoya (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 09/865,727

(22) Filed: May 29, 2001

(65) Prior Publication Data

US 2002/0043818 A1 Apr. 18, 2002

(30) Foreign Application Priority Data

May 29, 2000 (JP) .................................... 2000-158624

(51) Int. Cl.[7] .................................... B60J 5/06
(52) U.S. Cl. .................... 296/155; 49/358; 49/360
(58) Field of Search .................... 296/155; 49/358, 49/360

(56) References Cited

U.S. PATENT DOCUMENTS

| | | | | | |
|---|---|---|---|---|---|
| 5,233,789 | A | * | 8/1993 | Priest et al. | 49/360 |
| 5,316,365 | A | * | 5/1994 | Kuhlman et al. | 296/155 |
| 5,319,880 | A | * | 6/1994 | Kuhlman | 49/138 |
| 5,319,881 | A | * | 6/1994 | Kuhlman | 49/138 |
| 5,323,570 | A | * | 6/1994 | Kuhlman et al. | 49/138 |
| 5,531,498 | A | * | 7/1996 | Kowall | 296/146.4 |
| 6,092,338 | A | * | 7/2000 | Crowner et al. | 49/360 |

FOREIGN PATENT DOCUMENTS

| | | |
|---|---|---|
| DE | 198 19 421 A1 | 11/1999 |
| JP | 10-18708 A | 1/1998 |

* cited by examiner

*Primary Examiner*—D. Glenn Dayoan
*Assistant Examiner*—Patricia L. Engle
(74) *Attorney, Agent, or Firm*—Burns, Doane, Swecker & Mathis, LLP

(57) ABSTRACT

An opening and closing device for a sliding vehicle door that covers and uncovers a door opening portion defined in a vehicle body includes a driving mechanism installed in the sliding vehicle door and provided with an output drum and a cable wound by the output drum. The ends of the cable are operatively engaged with the vehicle body.

18 Claims, 6 Drawing Sheets

OPENING AND CLOSING DEVICE FOR SLIDING VEHICLE DOOR

This application is based on and claims priority under 35 U.S.C. §119 with respect to Japanese Application 2000-158624 filed on May 29, 2000, the entire content of which is incorporated herein by reference.

FIELD OF THE INVENTION

This invention generally relates to an openable and closable vehicle door. More particularly, the present invention pertains to a sliding vehicle door provided with a driving mechanism and an electric motor for slidably moving the door between one position in which an opening in the vehicle body is uncovered (i.e., exposed) and another position in which the opening in the vehicle body is covered.

BACKGROUND OF THE INVENTION

A known vehicle sliding door for exposing and covering a door opening portion provided in a vehicle body is described in a Japanese Patent Application Publication published as Toku-Kai-Hei 10 (1998)-18708. This vehicle sliding door is slidably supported by a center guide rail which extends in the front and rear directions on the vehicle body. The opening and closing device is installed in the vehicle body and is provided with a driving mechanism and an endless cable (i.e., a closed loop cable). The driving mechanism serves as a driving source and includes an electric motor and an output drum. The cable, which is operatively connected to the sliding door, is retracted by the output drum of the driving mechanism. Further, the cable is guided by the center guide rail from an end of the guide rail at the vehicle rear side and is folded back by a guiding pulley arranged at the other end of the center guide rail at the vehicle front side.

During operation, the cable is retracted by the output drum or is released from the output drum in correspondence with the rotation of the output drum produced by the driving operation of the motor. The cable is thus reciprocated in both directions along the center guide rail to move the sliding door for covering and uncovering the door opening portion through reciprocating movement of the cable.

The aforementioned vehicle sliding door opening and closing device may suffer from several disadvantages and drawbacks. The driving mechanism is disposed in the vehicle body and so the vehicle body must have an exclusively used mechanism to maintain an installing space for the driving mechanism, to define an opening portion for disposing the cable. Accordingly, difficulties may arise with respect to installation of the known opening and closing device which is accommodated in the vehicle body. Additionally, because the guiding pulley is disposed at the other end of the center guide rail, the center guide rail has to be long enough to accommodate the guiding pulley. Therefore, the driving mechanism installed in the vehicle body may project in the direction of the interior and thus may limit the size of the vehicle compartment. Furthermore, as the cable is reciprocated in opposite directions along the center guide rail, manual sliding operation of the sliding door may require a relatively significant amount of power to overcome the sliding resistance of the cable when the driving mechanism is inactive.

A need thus exists for an improved vehicle sliding door opening and closing device which has sufficient space for installing the driving mechanism without the same restrictions as the known device.

It would also be desirable to provide a vehicle sliding door opening and closing device that does not adversely impact the volume of the vehicle interior to the same extent as the known device.

Further, a need exists for a vehicle sliding door opening and closing device that is able to control increases in the sliding resistance caused by the cable.

SUMMARY OF THE INVENTION

According to one aspect of the invention, an opening and closing device for a sliding vehicle door that covers and uncovers a door opening portion defined in a vehicle body includes a driving mechanism installed in the sliding vehicle door and provided with an output drum and a cable wound by the output drum. The cable includes two ends that are operatively engaged with the vehicle body.

According to the present invention, the driving mechanism is installed in the sliding door and so less difficulty arises with respect to installing the driving mechanism. Further, the opening and closing device of the present invention is able to provide sufficient accommodation space for the driving mechanism.

Additionally, the cable is not required to be reciprocated relative to the guide rail so that a guiding pulley is not required with the guide rail. Therefore, the length of the guide rail is not required to accommodate the guiding pulley. Further, the opening and closing device of the present invention does not increase the sliding resistance caused by the cable.

According to another aspect of the invention, an opening and closing device that moves a sliding vehicle door mounted on a vehicle body between a closed position in which a door opening portion defined in the vehicle body is covered and an open position in which the door opening portion is uncovered includes a motor mounted on the sliding vehicle door, an output drum operatively connected to the motor to rotate in response to operation of the motor, a cable wound about the output drum and having at least first and second ends, and a pair of spaced apart guide pulleys mounted on the sliding vehicle door. One portion of the cable extending from the output drum to the first end of the cable engages both of the guide pulleys, while another portion of the cable extending from the output drum to the second end of the cable engages both of the guide pulleys. The first end of the cable is operatively engaged with the vehicle body and the second end of the cable is operatively engaged with the vehicle body.

According to a further aspect of the invention, an opening and closing device that moves a sliding vehicle door mounted on a vehicle body between a closed position in which a door opening portion defined in the vehicle body is covered and an open position in which the door opening portion is uncovered includes a motor mounted on the sliding vehicle door, an output drum operatively connected to the motor to rotate in response to operation of the motor, a cable wound about the output drum and having at least first and second ends, a guide rail mounted on the vehicle body, and a guide roller mounted on the sliding vehicle door and positioned in the guide rail for movement along the guide rail during movement of the sliding vehicle door between the closed and open positions. The first end of the cable is connected to either the guide rail or the vehicle body, and the second end of the cable is connected to either the guide rail or the vehicle body.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
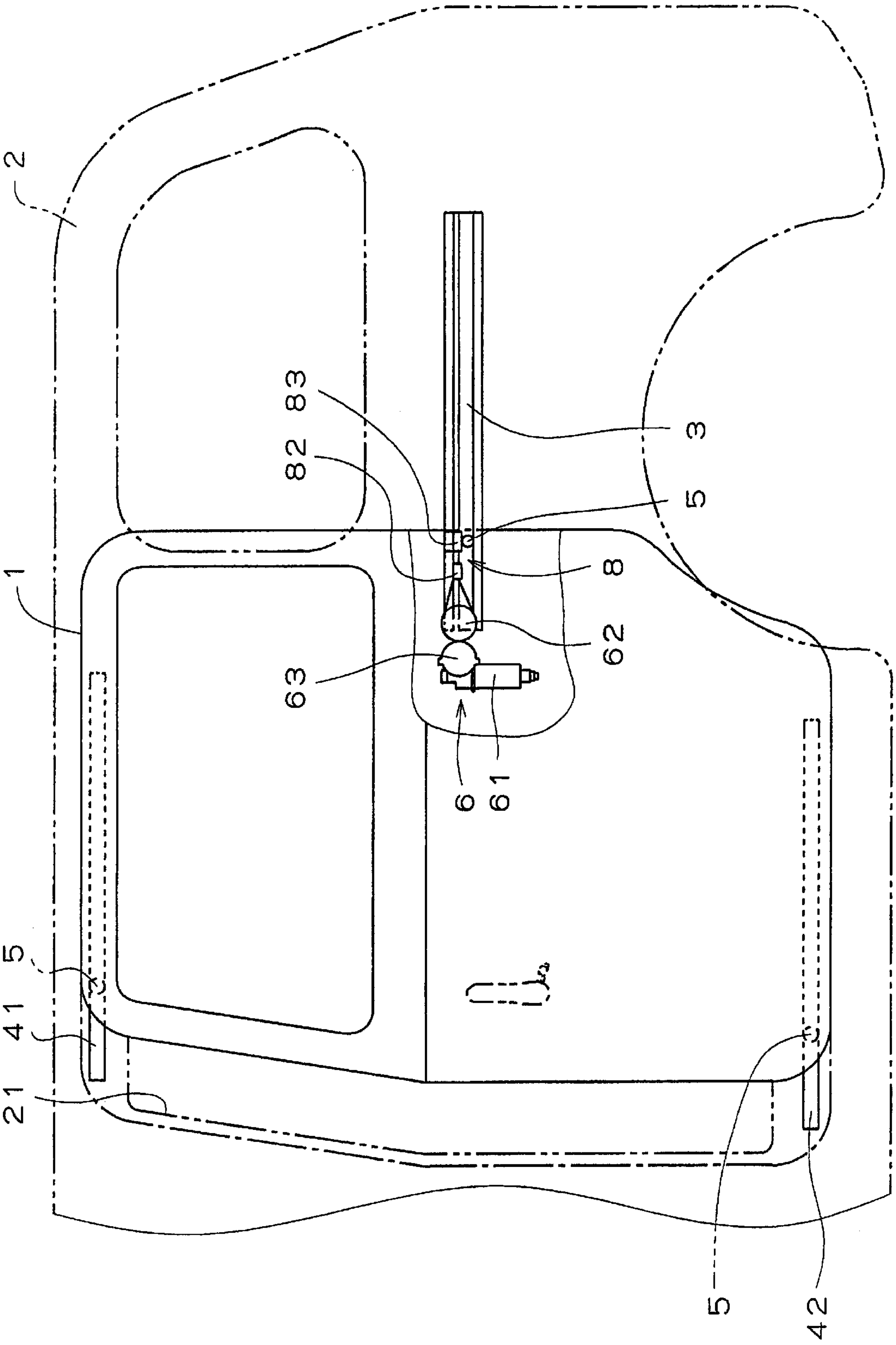
FIG. 1 is a side view of a portion of a vehicle (a van) illustrating the vehicle sliding door opening and closing device according to an embodiment of the present invention.
Figure 2:
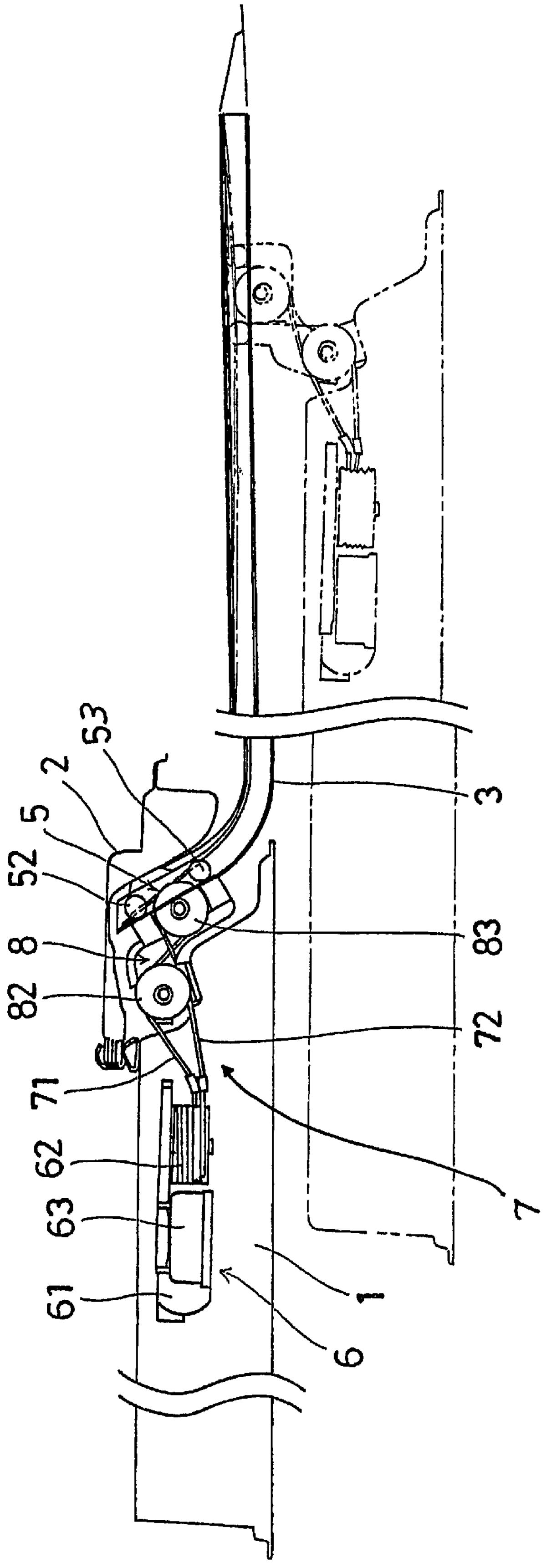
FIG. 2 is a cross-sectional view of a portion of the vehicle shown in FIG. 1 illustrating the opening and closing device according to the present invention.

FIGS. 1 and 2 illustrate a vehicle sliding door 1 for a covering and uncovering a generally rectangularly-shaped door opening portion 21 defined in the lateral side body 2 of a vehicle (e.g., a van-type vehicle). As seen specifically in FIG. 1, an upper guide rail 41 is disposed adjacent the top border or upper edge of the door opening portion 21 and is fixed to the side body 2. A lower guide rail 42 is disposed adjacent the bottom border or bottom edge of the door opening portion 21 and is also fixed to the side body 2. Further, a center guide rail 3 is fixed to the outside surface of the side body 2 at a position rearward of door opening portion 21. The sliding door 1 is supported along the guide rails 3, 41, 42 for sliding movement relative to the vehicle side body 2 in the vehicle front and rear directions.

Respective guide roller units 5 are slidably guided by each of the guide rails 3, 41, 42 and are rotatably supported by the sliding door 1. During sliding movement of the guide roller units 5 relative to or along the respective guide rails 3, 41, 42, the sliding door 1 is guided by the guide rails 3, 41, 42 and is thus slidably moved to effect the covering and uncovering operation of the door opening portion 21. The guide rails 3, 41, 42 are arranged parallel with each other, with the front edge of each guide rail 3, 41, 42 being bent towards the interior of the vehicle so that the sliding door 1 is guided to be approximately in alignment with the outer surface of the side body 2 when the sliding door is in the closed position covering the door opening portion 21. On the other hand, the sliding door 1 is slidably movable in the rearward direction from the closed position to the open position at which the sliding door is positioned along the outer surface of the side body 2. In the open position of the slide door, the door opening portion 21 is uncovered to permit access through the door opening portion 21.

Figure 5:
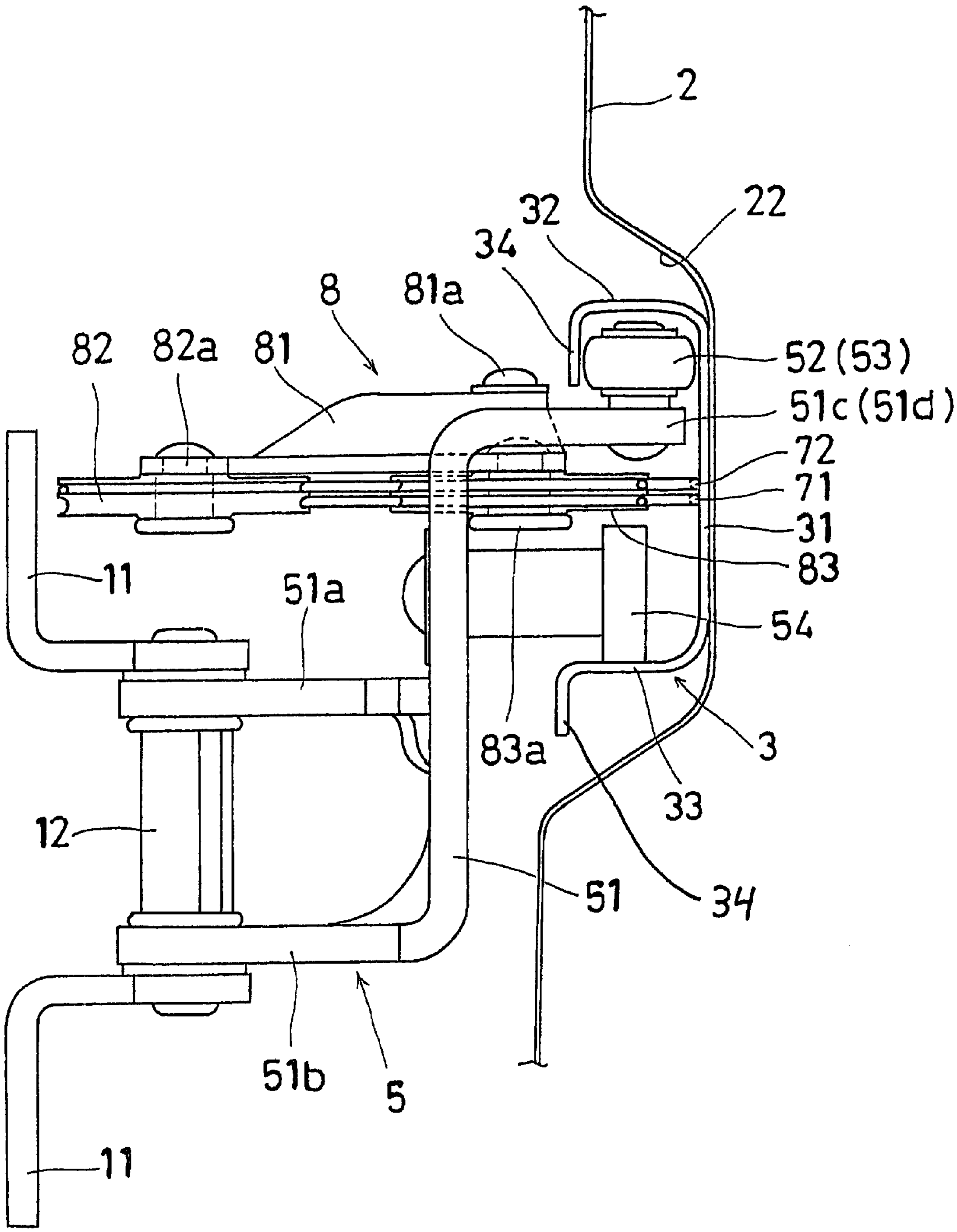
FIG. 5 is a front view of the powered sliding unit illustrated in FIG. 3.

As shown in FIG. 5, the center guide rail 3 is disposed in a concave or recessed portion 22 defined in the outer surface of the side body 2. The center guide rail 3 is provided with a vertical wall 31, an upper wall 32, a lower wall 33 and a pair of flange walls 34. The vertical wall 31 is fixed to the outer surface of the side body 2, the upper wall 32 extends outwardly in the direction of the vehicle outer space from the upper end portion of the vertical wall 31, and the lower wall 33 extends outwardly in the direction of the vehicle outer space from the lower end portion of the vertical wall 31. The upper and lower walls 32, 33 are parallel to each other in the horizontal direction. The flange walls 34 extend downwardly in the vehicle bottom direction from the outwardly extending end portion of the upper wall 32 and the outwardly extending end portion of the lower wall 33. The flange walls 34 each extend parallel with the vertical wall 31. The center guide rail 3 thus possesses an approximately reverse C-shaped configuration as seen from the end.

Figure 3:
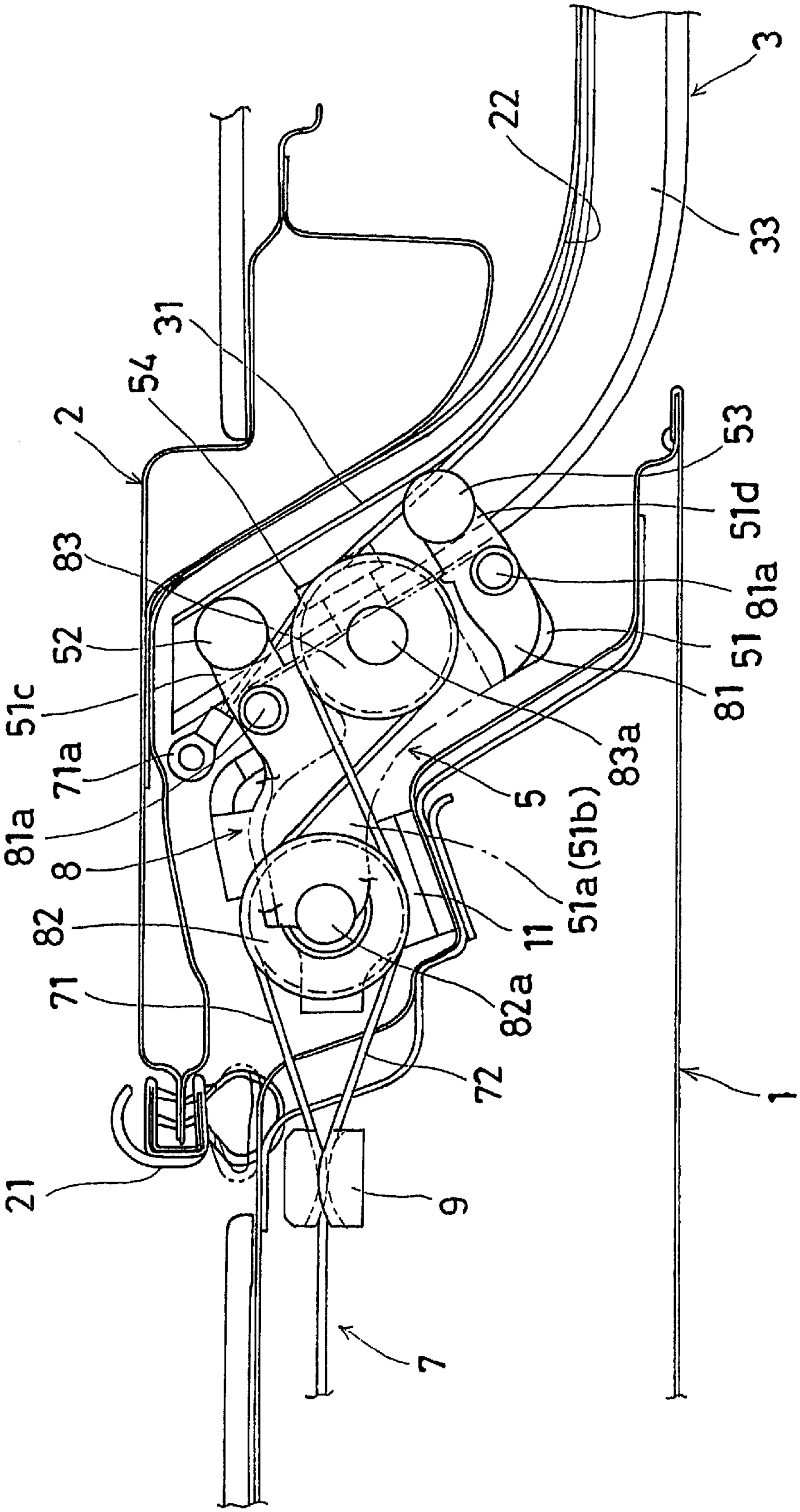
FIG. 3 is a top view of a powered sliding unit used in the present invention when the door opening portion is in the covered condition.

As shown in FIGS. 3 and 5, the guide roller unit 5 for the center guide rail 3 includes a base plate 51 which is relatively rotatably supported by a shaft or pin 12. The shaft 12 extends in the vertical direction of the vehicle (i.e., the upper and lower directions in FIG. 5) and is operatively connected to a pair of brackets 11 which are fixed to the sliding door 1. The base plate 51 is formed with a pair of leg portions 51*a*, 51*b* and a pair of horizontal flange portions 51*c*, 51*d*. The pair of leg portions 51*a*, 51*b* are parallel with each other and spaced apart by a predetermined distance in the vehicle vertical direction. The extended edge or free end of each leg portion 51*a*, 51*b* is arranged between the pair of brackets 11. Each of the leg portions 51*a*, 51*b* is penetrated by the shaft 12 for permitting relative rotational movement with respect to the shaft 12 and is fixed to respective one of the brackets 11 via both edges of the shaft 12. The base plate 51 is thus supported by the brackets 11 and is rotatably movable to the brackets 11. Further, the guide roller unit 5 is supported by the sliding door 1 and is movable relative to the slide door.

The horizontal flange portions 51*c*, 51*d* are aligned with each other while maintaining a predetermined distance between the flange portions 51*c*, 51*d* in the vehicle front and rear directions. The edge of each flange portion 51*c*, 51*d* extends between the upper wall 32 and the lower wall 33 and is parallel with the upper and lower walls. The guide roller unit 5 includes a rotatably movable inner roller 52 supported by the edge of the flange portion 51*c* and a rotatably movable outer roller 53 supported by the edge of the flange portion 51*d*. Both the inner and outer rollers 52, 53 are slidably in contact with the vertical wall 31 and one of the flange walls 34 of the center guide rail 3.

The guide roller unit 5 also includes a roller 54 rotatably supported by the base plate 51. The roller 54 is slidably in contact with the lower wall 33 of the center guide rail 3. With the construction of the guide roller unit 5 described above, the guide roller unit 5 is slidably guided by the center guide rail 3 without any play in the vehicle vertical and lateral directions. The other guide roller units 5 guided in the guide rails 41, 42 possess the same general construction as the guide roller unit 5 described above and so a detailed description of such guide roller units is not repeated here. The sliding door 1 is thus slidably supported by the guide roller units 5 via the guide rails 3, 41, 42 and is operatively connected with the side body 2. The sliding door 1 is slidably moved by through operation of a powered sliding unit (described in more detail below) through slidable movement of the guide roller units 5 relative to the guide rails 3, 41, 42.

As shown in FIG. 2, components of the powered sliding unit of the opening and closing device of the present invention include a driving mechanism 6, a cable 7 and a pulley mechanism 8. The driving mechanism 6 is disposed in the sliding door 1 and is fixed to a door panel of the sliding door 1 by a suitable mechanism such as a bracket. The driving mechanism 6 includes an electric motor 61 operating as a driving source and a rotatable output drum 62. The output drum 62 is operatively connected with an output shaft of the motor 61 via a reduction gear mechanism 63 so as to be rotated in reciprocable or opposite directions corresponding to the rotational direction (i.e., forward and reverse rotations) of the motor 61.

Figure 4:
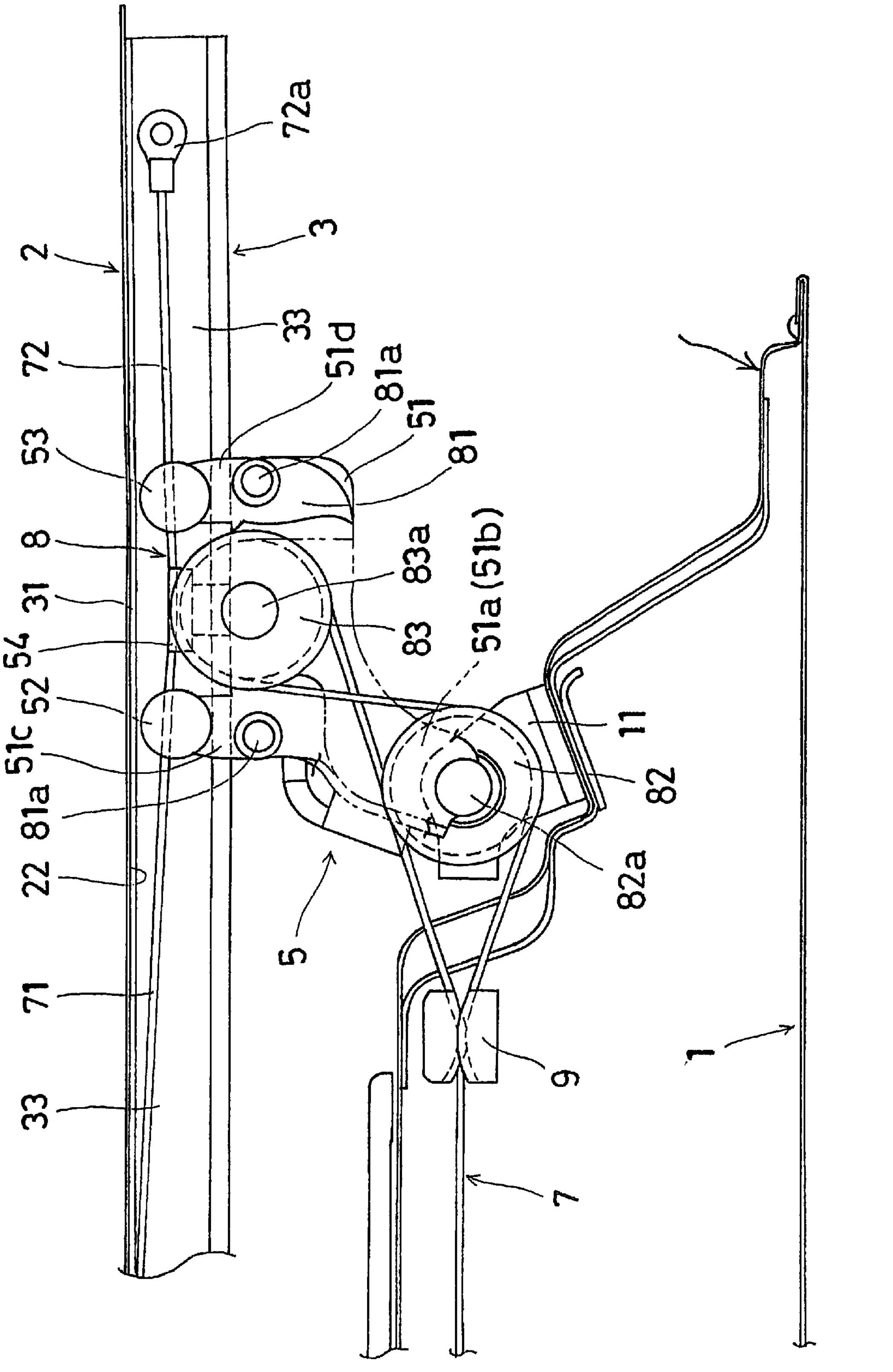
FIG. 4 is a top view of the powered sliding unit when the door opening portion is in the uncovered condition.

The cable 7 includes a pair of wires 71, 72. One end of each wire 71, 72 engages the output drum 62 and is adapted to be wound by the output drum. As shown in FIG. 3, the wire 71 is guided by a wire guide 9 disposed in the sliding door 1 and the pulley mechanism 8 positioned between the sliding door 1 and the side body 2 and arranged in the center guide rail 3. Further, the other end 71*a* of the wire 71 is fixed to a body panel of the side body 2 in the vicinity of the front end portion of the center guide rail 3. As shown in FIG. 4, the guide wire 72 is guided by the wire guide 9 disposed in the sliding door 1 and the pulley mechanism 8 positioned between the sliding door 1 and the side body 2 and arranged in the center guide rail 3. Further, the other end 72*a* of the guide wire 72 is fixed to the lower wall 33 at a rear end portion of the center guide rail 3. Thus, the other end 72*a* of the guide wire 72 is operatively connected to the sliding door by virtue of the end 72*a* of the guide wire being connected to the center guide rail and the center guide rail being connected to the sliding door.

Although the cable 7 includes two wires 71, 72 according to the above-described embodiment of the invention, it is to be understood that the cable 7 need not necessarily be defined by two separate wires 71, 72. As one alternative, the cable 7 can be provided with a single wire which is wound by the output drum 62, with the ends being fixed at a proper position of the vehicle body. Additionally, the engaging position of the other ends 71*a*, 72*a* of the wires can be located anywhere, including the aforementioned position, so long as the engaging position is between the front end and the rear end of the vehicle body in the vehicle front and rear directions within the sliding range of the sliding door 1.

The pulley mechanism 8 includes a base bracket 81. The pulley mechanism 8 is fixed to the base plate 51 via the base bracket 81 by a screw 81*a*. A pair of guiding pulleys 82, 83 forming the pulley mechanism are rotatably supported by shafts or pins 82*a*, 83*a* in the base bracket 81. As illustrated in FIG. 5, the shaft 82*a* is positioned coaxially with the shaft 12. Therefore, the rotation axis or center axis of the guiding pulley 82 is coaxial with the rotation axis or center axis of the guide roller unit 5. Additionally, the guiding pulley 83 is disposed between the rollers 52, 53 as illustrated in FIG. 4, with a portion of the outer periphery of the guiding pulley 83 being set in or located within the center guide rail 3. As shown in FIGS. 3 and 4, the portions of the wires 71, 72 intersect each other and are guided by the guiding pulleys 82, 83 so as to be disposed in the center guide rail 3.

Upon the rotation of the output drum 62 in a direction corresponding to the normal or forward driving direction of the electric motor 61 when the door opening portion 21 is covered or closed by the sliding door (i.e., the state in which the sliding door 1 is in the closed position shown by the solid line in FIG. 2), the wire 72 is retracted by the output drum 62 and the wire 71 is released from the output drum 62. As the wires 71, 72 are engaged with the vehicle body at the ends 71*a*, 72*a*, the guiding pulley 83 is moved toward the rear direction of the vehicle (i.e., the right side in FIG. 2) through sliding movement of the guide roller unit 5 along the center guide rail 3 and relative to the center guide rail. Corresponding to the sliding movement of the guide roller unit 5, the sliding door 1 is slidably moved in the opening direction (i.e., towards the right side in FIG. 2), wherein the door opening portion 21 is uncovered or exposed (i.e., the sliding door 1 is moved to the open position shown as a double-dashed line in FIG. 2).

Upon the rotation of the output drum 62 in the other direction corresponding to the reverse driving direction of the electric motor 61 when the door opening portion 21 is uncovered (i.e., when the sliding door is in the open position), a movement of the wires 71, 72 opposite to that described above is carried out. In other words, the wire 72 is released from the output drum 62 and the wire 71 is retracted by the output drum. Accordingly, the guiding pulley 83 is moved in the forward direction of the vehicle (i.e., to the left in FIG. 2) through sliding movement of the guide roller unit 5 along the center guide rail 3 and relative to the center guide rail. Corresponding to the sliding movement of the guide roller unit 5, the sliding door 1 is slidably moved in the closing direction (i.e., to the left in FIG. 2), wherein the door opening portion 21 is covered or closed.

Immediately after the initiation of the shifting operation of the door opening portion 21 from the covered state to the uncovered state is carried out by the sliding operation of the sliding door 1 and immediately before the termination of the shifting operation from the uncovering state to the covering state is carried out, the guide roller units 5 are slidably moved along each bent front end of the guide rails 3, 41, 42. Accordingly, the guide roller units 5 are moved relative to the sliding door 1 around the shaft 12 so as to keep or maintain the posture of the sliding door 1. In this case, the movement of the guide roller units 5 may cause looseness to one of the wires 71, 72 by a difference between the retracted amount and the released amount of the wires 71, 72. However, according to the opening and closing device of the present invention, the wires 71, 72 can be retracted or released at a constant amount by virtue of the intersection thereof and the guiding by the pair of guiding pulleys 82 and 83. Therefore, the opening and closing device of the present invention can maintain the smooth sliding operation of the sliding door 1.

Figure 6:
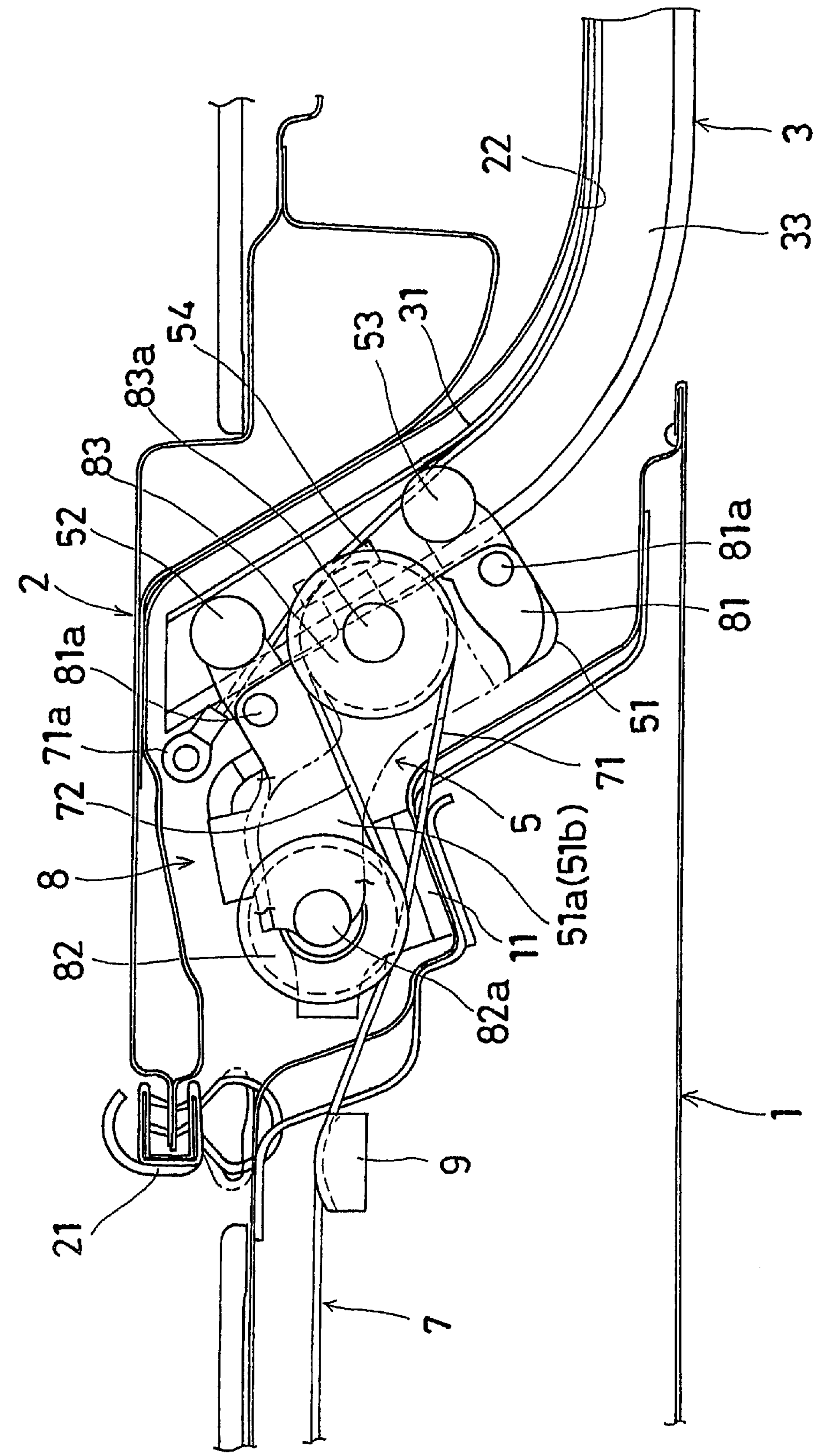
FIG. 6 is a top view of the powered sliding unit similar to FIG. 3, but showing a different arrangement of the cable structure.

According to the above described structure of the present invention, the cable 7 is guided at both sides of the guiding pulleys 82, 83. That is, the wire 71 is guided along one side of the guide pulley 82 and one side of the guide pulley 83, while the other wire 72 is guided along another side of the guide pulley 82 and along another side of the guide pulley 83. However, it is possible to employ an alternative configuration as shown in FIG. 6. Here, the cable 7 is guided at both guiding portions or sides of the guiding pulley 83 and at one guiding portion or side of the guiding pulley 82. That is, the wire 71 is guided along one side of the guide pulley 82 and one side of the guide pulley 83, while the other wire 72 is guided along the same side of the guide pulley 82 and along another side of the guide pulley 83. In the case of the alternative arrangement shown in FIG. 6, it is useful to employ a tension adjusting mechanism at the ends 71*a*, 72*a* of the wires to absorb any looseness in the wires 71, 72.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claimed is:

1. An opening and closing device for a sliding vehicle door that covers and uncovers a door opening portion defined in a vehicle body, comprising:

a driving mechanism installed in the sliding vehicle door and provided with an output drum;

a cable wound by the output drum, one end of the cable being operatively engaged with the vehicle body and another end of the cable being operatively engaged with the vehicle body;

a guide rail provided in the vehicle body and slidably supporting the vehicle door; and the cable being disposed in the guide rail, the one end of the cable being engaged with the vehicle body by virtue of being engaged with one end portion of the guide rail and the another end of the cable being engaged with the vehicle body by virtue of being engaged with an opposite end portion of the guide rail.

2. The opening and closing device according to claim 1, wherein the guide rail is disposed on an outer surface of the vehicle body at a position rearwardly of the door opening portion.

3. The opening and closing device according to claim 1, further comprising:

a supporting member rotatably supported by the sliding vehicle door and slidably guided by the guide rail; and a pair of guiding pulleys guiding the cable, with portions of the cable intersecting one another, one of the pair of guiding pulleys being disposed coaxially with a rotational center axis of the supporting member relative to the sliding door and the other of the pair of guiding pulleys being disposed at a slidable portion of the supporting member relative to the guide rail.

4. The opening and closing device according to claim 1, wherein the cable includes two wires, with an end of each wire being fixed to the drum, an opposite end of one wire being fixed to the vehicle body and an opposite end of the other wire being fixed to the guide rail.

5. An opening and closing device that moves a sliding vehicle door mounted on a vehicle body between a closed position in which a door opening portion defined in the vehicle body is covered and an open position in which the door opening portion is uncovered, comprising:

a motor mounted on the sliding vehicle door;

an output drum operatively connected to the motor to rotate in response to operation of the motor;

a cable wound about the output drum, the cable having at least first and second ends;

a pair of spaced apart guide pulleys mounted on the sliding vehicle door, one portion of the cable extending from the output drum to the first end of the cable engaging both of the guide pulleys, another portion of the cable extending from the output drum to the second end of the cable engaging both of the guide pulleys; and the first end of the cable being operatively engaged with the vehicle body and the second end of the cable being operatively engaged with the vehicle body.

6. The opening and closing device according to claim 5, including a guide rail provided in the vehicle body, at least a portion of the cable being disposed in the guide rail.

7. The opening and closing device according to claim 6, wherein the first end of the cable is operatively engaged with the vehicle body by virtue of being connected to the guide rail adjacent one end of the guide rail.

8. The opening and closing device according to claim 6, wherein the guide rail is disposed on an outer surface of the vehicle body at a position rearwardly of the door opening portion.

9. The opening and closing device according to claim 6, including a supporting member rotatably supported on the sliding vehicle door and slidably guided by the guide rail.

10. The opening and closing device according to claim 9, wherein one of the guiding pulleys is coaxially disposed with a rotational center axis of the supporting member.

11. The opening and closing device according to claim 5, wherein the one portion of the cable and the another portion of the cable cross one another.

12. The opening and closing device according to claim 5, wherein the one portion of the cable constitutes a first wire and the another portion of the cable constitutes a second wire that is separate from the first wire.

13. An opening and closing device that moves a sliding vehicle door mounted on a vehicle body between a closed position in which a door opening portion defined in the vehicle body is covered and an open position in which the door opening portion is uncovered, comprising:

a motor mounted on the sliding vehicle door;

an output drum operatively connected to the motor to rotate in response to operation of the motor;

a cable wound about the output drum, the cable having at least first and second ends;

a guide rail mounted on the vehicle body;

a guide roller mounted on the sliding vehicle door and positioned in the guide rail for movement along the guide rail during movement of the sliding vehicle door between the closed and open positions;

the first end of the cable being connected to either the guide rail or the vehicle body; and the second end of the cable being connected to either the guide rail or the vehicle body.

14. The opening and closing device according to claim 13, wherein the guide rail is disposed on an outer surface of the vehicle body at a position rearwardly of the door opening portion.

15. The opening and closing device according to claim 13, including a supporting member rotatably supported on the sliding vehicle door and slidably guided by the guide rail.

16. The opening and closing device according to claim 15, including a pair of guiding pulleys engaged by the cable at a plurality of spaced apart locations, one of the guide pulleys being coaxially disposed with a rotational center axis of the supporting member.

17. The opening and closing device according to claim 13, wherein portions of the cable cross one another.

18. The opening and closing device according to claim 13, wherein the cable includes two separate wires.

* * * * *